United States Patent [19]
Rockwood et al.

[11] 3,973,213
[45] Aug. 3, 1976

[54] COMPACT, HIGH ENERGY GAS LASER

[75] Inventors: Stephen D. Rockwood; Robert E. Stapleton; Thomas F. Stratton, all of Los Alamos, N. Mex.

[73] Assignee: The united States of America as represented by the United States Energy Research and Development Administration, Washington, D.C.

[22] Filed: May 28, 1974

[21] Appl. No.: 473,660

[52] U.S. Cl. ............................ 330/4.3; 331/94.5 C; 331/94.5 D
[51] Int. Cl.² ........................................... H01S 3/00
[58] Field of Search ................. 331/94.5 C, 94.5 D; 330/4.3

[56] References Cited
UNITED STATES PATENTS

| | | | |
|---|---|---|---|
| 3,428,914 | 2/1969 | Bell | 330/4.3 |
| 3,739,296 | 6/1973 | Beiser | 331/94.5 C |
| 3,794,929 | 2/1974 | Carr | 330/4.3 |

OTHER PUBLICATIONS

Casperson et al., IEEE Journal Quantum Electronics, QE–9, No. 4, 4–1973.

Primary Examiner—T.H. Tubbesing
Assistant Examiner—S.C. Buczinski
Attorney, Agent, or Firm—Dean E. Carlson; Edward C. Walterscheid

[57] ABSTRACT

An electrically pumped gas laser amplifier unit having a disc-like configuration in which light propagation is radially outward from the axis rather than along the axis. The input optical energy is distributed over a much smaller area than the output optical energy, i.e., the amplified beam, while still preserving the simplicity of parallel electrodes for pumping the laser medium. The system may thus be driven by a comparatively low optical energy input, while at the same time, owing to the large output area, large energies may be extracted while maintaining the energy per unit area below the threshold of gas breakdown.

5 Claims, 13 Drawing Figures

COMPACT, HIGH ENERGY GAS LASER

BACKGROUND OF THE INVENTION

The invention described herein was made in the course of, or under, a contract with the U.S. ATOMIC ENERGY COMMISSION. It relates to electrically pumped gas lasers and more particularly to electrically pumped high-energy gas laser amplifiers in which gas breakdown of the lasing medium is substantially obviated.

When gases are irradiated by high intensity laser pulses, free electrons located within the beam path may be elevated to sufficient energies to collisionally ionize other gas molecules and/or atoms, resulting in a rapid growth of the free electron number density. The coefficient for absorption of photons by free electrons increases as the electron density increases, hence the electron cascade results in an abrupt attenuation of the laser beam. This attenuation of the laser pulse and resultant heating of the gas is defined as gas breakdown. It is also known in the literature as optical breakdown. Unfortunately, breakdown may occur in any gas, including those which constitute lasing mediums, if the laser pulse is sufficiently intense. It is thus readily apparent that gas breakdown constitutes a very substantial problem that must be overcome in the design of high-energy, gas laser amplifiers.

The literature discloses that the breakdown thresholds for many gases by light of various wavelengths have been determined experimentally as well as theoretically. The breakdown threshold is a function of gas constituents, pressure, temperature, laser frequency, and pulse length. The most recent data on $CO_2$ laser mixtures is provided by Rockwood et al., 9 IEEE J.Q.E. 154 (1973). These data may be roughly summarized by $$E_{threshold} \approx \frac{5}{p} \left( \frac{10.6 \ \mu m}{\lambda} \right)^2 \text{ joule/cm}^2 \qquad (1)$$

for pulse lengths $t_p \ll 1$ nsec where $\lambda$ is the laser wavelength in $\mu$m and $p$ is the gas pressure in atmospheres. This dependence switches to $$P_{threshold} \approx 6 \times 10^8 \left( \frac{10.6 \ \mu m}{\lambda} \right)^2 \text{ W/cm}^2 \qquad (2)$$

for $t_p \gg 1$ nsec.

In all instances, and regardless of the gas, the threshold is set by a certain energy or power per unit area. Thus to pass more energy without inducing breakdown, the area over which the energy is distributed must be increased. In the case of a conventional electrically pumped rectangular amplifier, this presents a difficult problem in that the cross-sectional area is fixed and independent of length. It is, of course, possible to alter the cross-sectional area of the pumped lasing medium by increasing the distance between the electrodes. This approach, however, rapidly results in such an increase in the required voltage across the electrodes that a point is quickly reached at which it is not feasible to achieve any higher energy output.

SUMMARY OF THE INVENTION

Figure 1:
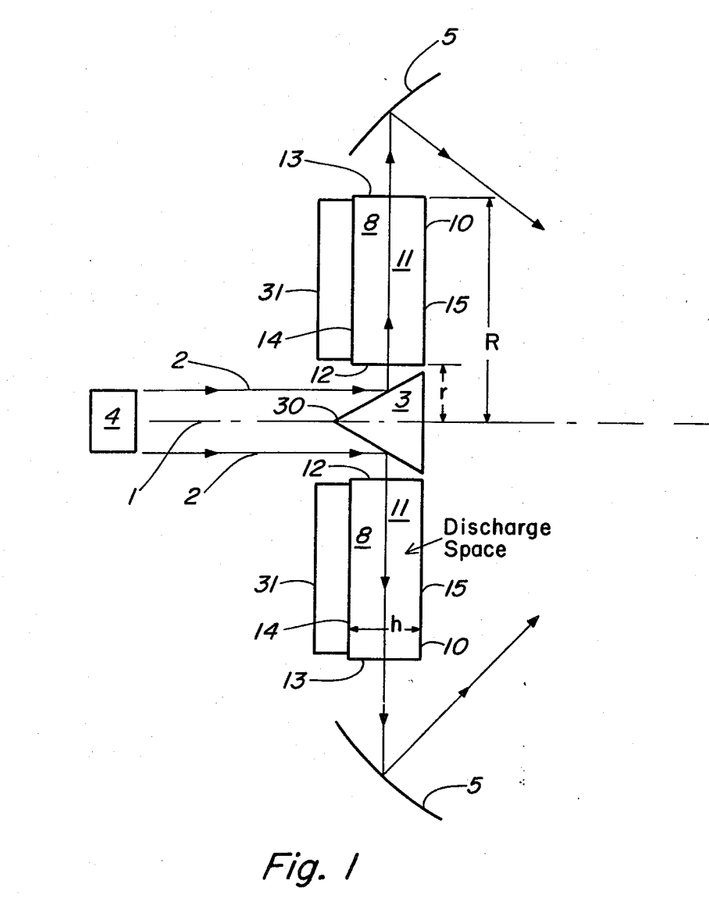
FIG. 1 is a simplified cross-sectional schematic view of the working region of an amplifier unit in accordance with the invention.

We have found that the problem of gas breakdown in high-energy electrically pumped gas laser amplifiers is large obviated by constructing such amplifiers in the form of thick discs and propagating the laser pulse radially outward in the disc from the center axis of the disc. For such a radial geometry, the area of the output window increases according to $$A = 2\pi hr,$$

where $r$ is the radius of the disc and $h$ is the height, i.e., the distance between the planar surfaces of the pumping electrodes (see FIG. 1). Thus, as the energy goes up through amplification along the radial path $r$, the area over which the energy is distributed also increases, resulting in substantial reduction of the tendency toward gas breakdown.

Specifically for the case of a saturated laser pulse, the flux increases as $$\nabla \cdot \phi = g_o \phi_s \qquad (3)$$

where $g_o$ is the small signal gain and $\phi_s$ is the saturation flux. Thus from Eq. (3) at any given distance $l$ along the gain path $\phi(l)$ for radial operation equals $\phi(l)/2$ for linear operation. That is to say, the laser beam expands so that the energy per unit area increases in accordance with the relationship $$\frac{E_{beam}}{A} \sim \frac{r}{2}$$

wherein $E_{beam}$ is the beam energy, $A$ is the cross-sectional area of the beam, and $r$ is the distance the beam has passed through the amplifier.

Figure 11:
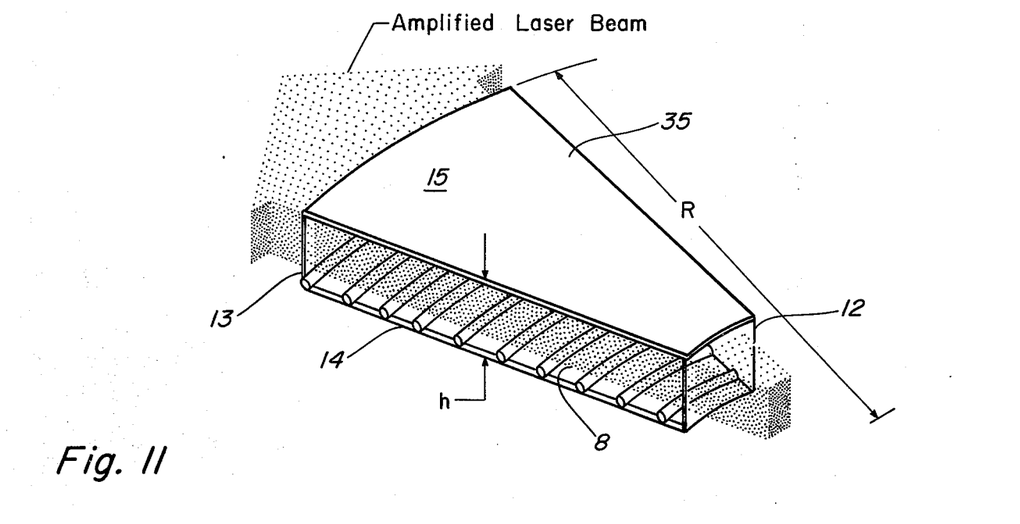
FIG. 11 shows schematically the manner in which the laser beam expands in a working region of the amplifier of FIGS. 8 and 9.

For radial operation in this manner, the output area can be increased with increasing $r$ while holding the voltage across the height $h$ constant. This is shown schematically in FIG. 11. Amplifiers of this type may be operated with any lasing gas, but are particularly suitable with $CO_2$ lasing mixtures.

Any high-energy gas laser amplifier system is within the scope of this invention which comprises (1) means defining an annulus, (2) a plurality of radially directed baffles forming a plurality of truncated wedge-shaped working regions in the annulus-defining means, (3) a gaseous lasing medium contained in each working region, (4) means for containing the lasing medium in the working region at a desired pressure, (5) means for producing an electrical discharge substantially uniformly throughout each of the working regions, with the electrical discharge being sufficient to produce a population inversion in the lasing medium, and (6) means for directing a laser beam to be amplified radially outwardly through the working region. Because of the very high voltage requirements that would otherwise be required, typically the annulus defined in an amplifier of this type has an outer radius which is greater than its height. As a result, it appears as a thick disc with a hole through the center.

GENERAL DESIGN CONSIDERATIONS

Figure 2:
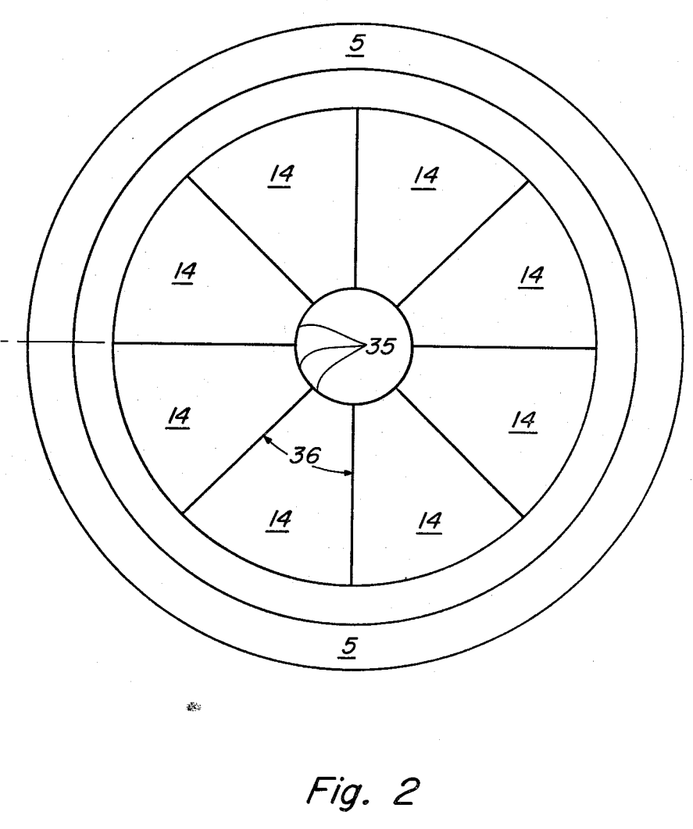
FIG. 2 is a schematic top view of the working region of an amplifier unit in accordance with the invention.

FIGS. 1 and 2 display schematically certain basic features of an amplifier unit designed in accordance with the present invention. An electrical pumping chamber 10 possessing cylindrical symmetry about axis 1 contains a gaseous lasing medium 11. Typically, lasing medium 11 will be at high pressure, i.e., atmospheric pressure or above. Pumping chamber 10 is divided into a plurality of truncated pie- or wedge-shaped segments 35 by baffles 36 which serve to prevent parasitic laser oscillations along nonradial paths within pumping chamber 10. Located on the inner and outer circumferences of pumping chamber 10 are a plurality of optical windows 12 and 13 transparent to the laser radiation to be amplified. Within each segment 35 windows 12 and 13 are radially aligned. A plurality of electrode means 14 and 15 are located within pumping chamber 10, with an electrode means 14 aligned with an electrode means 15. Each pair of aligned electrode means 14 and 15 are connected to an appropriate power supply 23 (see FIGS. 8, 9, and 10). Between each pair of aligned electrode means 14 and 15 is a volume 8 of lasing medium 11 in which light amplification occurs. Each volume 8 represents a working region of the amplifier. Electrode means 14 and 15 may be such that the unit operates as a TEA (transverse excited atmospheric) amplifier with, e.g., double discharge electrodes. Alternatively, a uniform discharge may be maintained in volumes 8 by separating the ionization mechanism in lasing medium 11 in volumes 8 from the electrical discharge itself. This requires the presence of preionization means 31 which produce a plasma in volumes 8 and which may be an electron gun for producing an electron beam directed through volumes 8. Typically, the electron gun is a cathode operating by thermionic emission or by field emission. Alternatively, preionization means 31 may be a radiation source suitable for producing uniform photoionization throughout volumes 8, a radioactive source suitable for producing uniformly ionizing radiation throughout volumes 8, or a low pressure gas discharge producing "runaway" electrons in a space charge neutralized plasma.

As shown in FIG. 1, an input laser beam 2, which has previously been shaped spatially and temporally, from oscillator or preamplifier stage 4 is incident on conical mirror 3 which distributes the input laser energy over 360° around axis 1 and radially through pumping chamber 10. Conical mirror 3 may have its surface concaved to correct for spherical divergences in the incoming laser beam 2 and thus cause this beam to assume parallel ray paths through the amplifier. Since the surface area per unit length along the cone increases with increasing radius, the greatest fraction of the energy is reflected from near the base of the cone. This property in part corrects for the decreasing intensity of the off-axis elements of the incoming laser beam 2 and produces a more uniform illumination of the amplifier in the transverse direction. To avoid reflection off the top 30 of mirror 3, which would travel back to the input system, input laser beam 2 may be so configured as to contain an intensity minimum on axis 1.

A uniform electrical discharge is initiated between electrode means 14 and 15 which produces a population inversion throughout lasing medium 11 in volumes 8 through which beam 2 passes and is amplified. The amplified beam 2 is then focused and directed as desired by mirror 5 which is a cylindrical section of either a paraboloid or an ellipsoid.

The amplifier is driven by a saturation flux $\phi_s$, thus fixing the input optical energy as the product of the input area times $\phi_s$. The input area is the cross-sectional area of beam 2 entering volumes 8, i.e., the volume of lasing medium being electrically pumped. As used within this application, electrical pumping means the addition of electrical energy to a laser gas in a quantity and manner sufficient to produce a population inversion therein. The cross-sectional exit area from volumes 8 is chosen such that the desired output energy $E_{out}$ divided by the exit area, yields a subbreakdown fluence.

Design parameters for a $CO_2$ amplifier constructed in accordance with the present invention may be determined through use of the relationships indicated hereafter.

Figure 3:
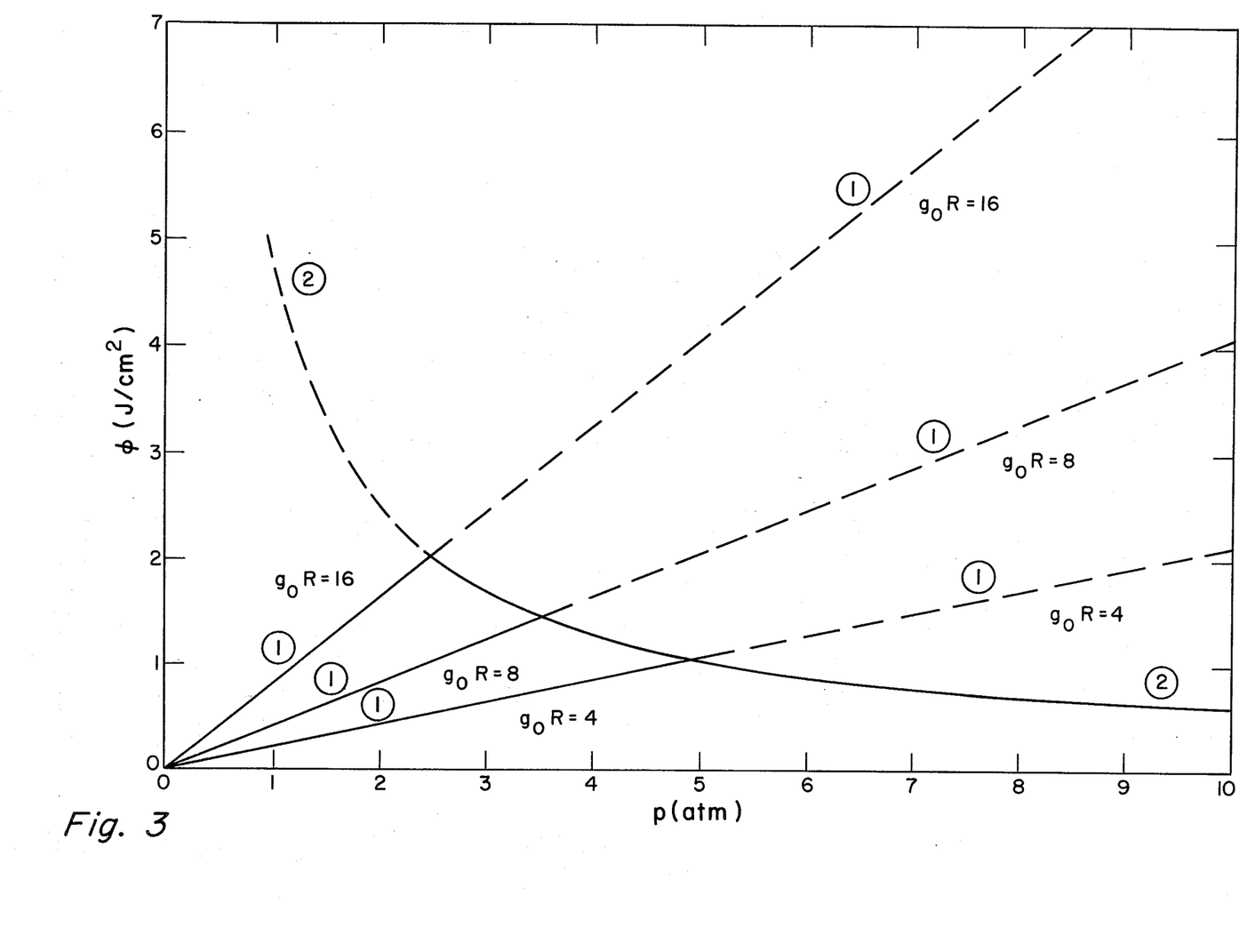
FIG. 3 displays the output fluence, $\phi$(joules/cm$^2$) of a radial amplifier as a function of pressure $p$ (atm). Line 1 parametric in $g_oR$ defines operation at saturation while line 2 displays the breakdown threshold, as given in Eq. (1).
Figure 4:
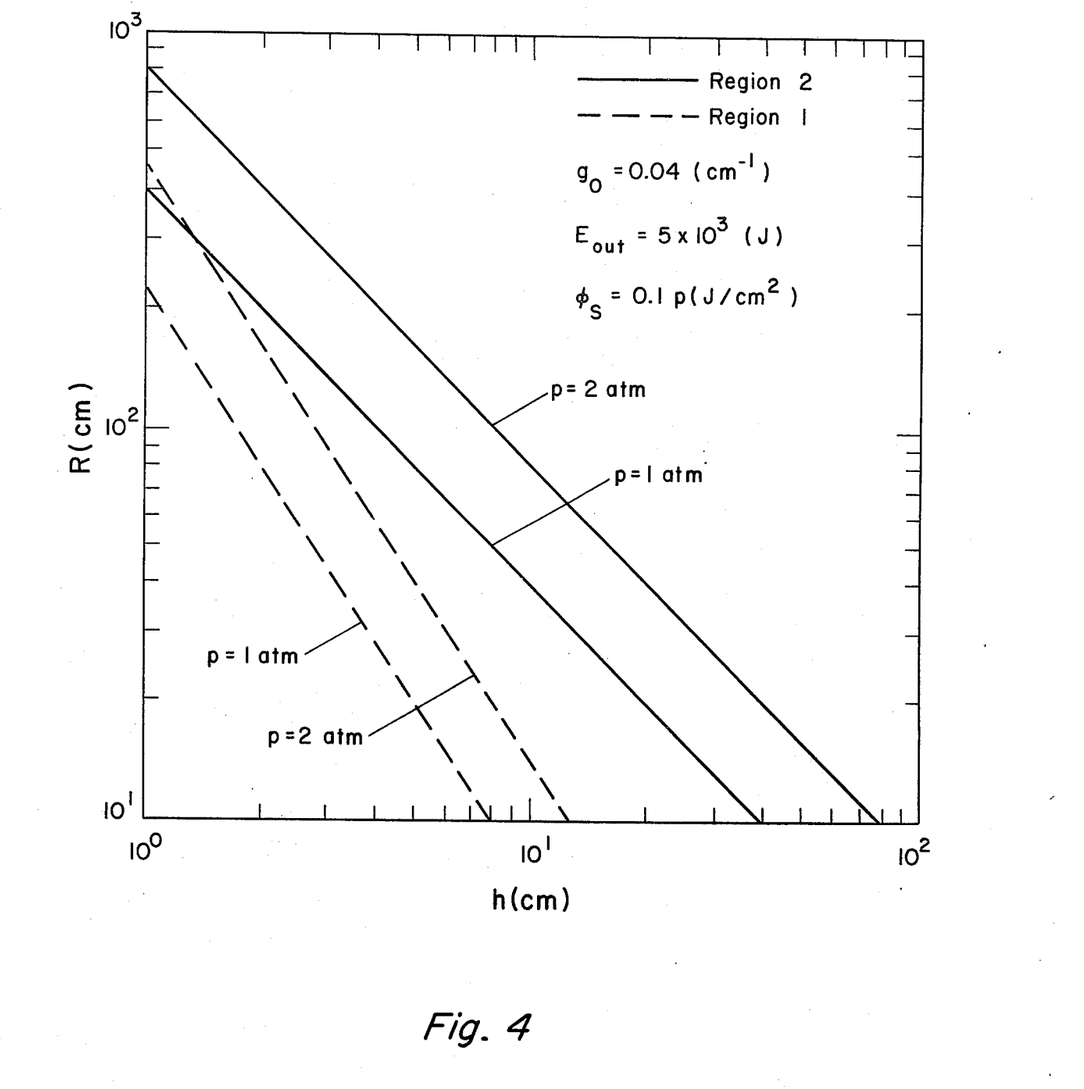
FIG. 4 gives the radius as a function of height for region 1 (dashed line) and region 2 (solid line) parametric in the pressure $p$(atm).
Figure 5:
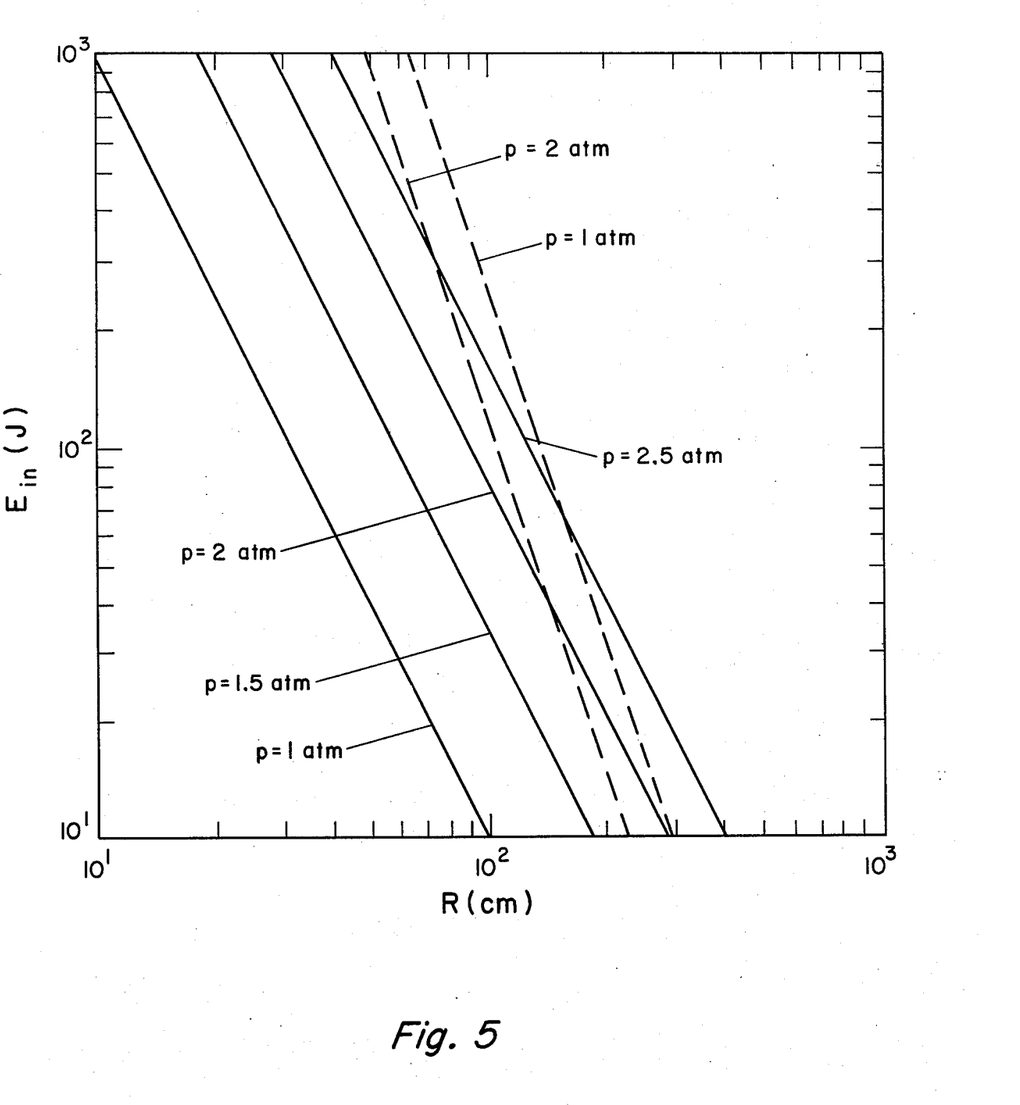
FIG. 5 displays the input optical energy required as a function of outer radius of the disc assuming the inner radius equals the height.
Figure 6:
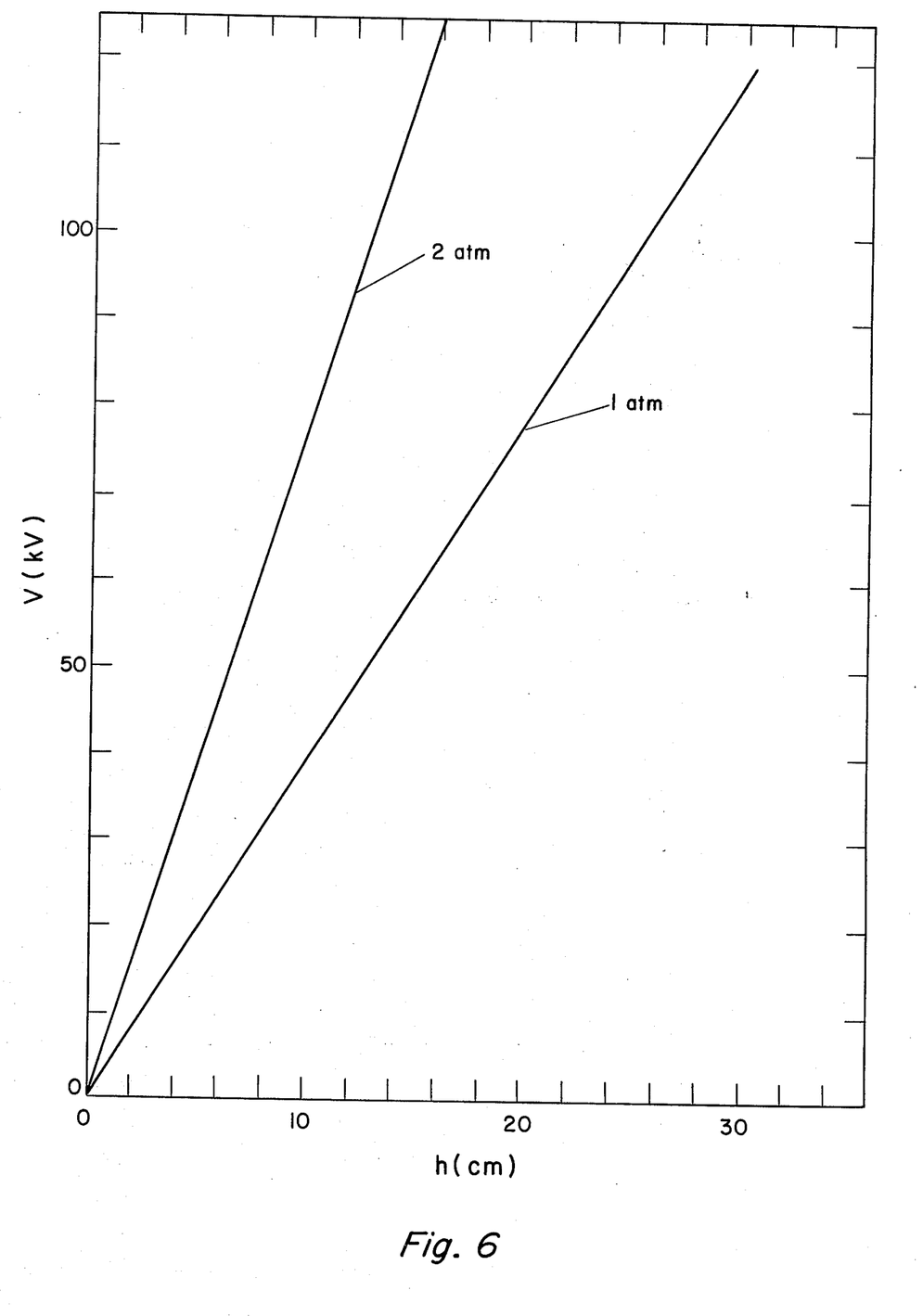
FIG. 6 gives the required gas discharge voltage as a function of height based on $\epsilon/p = 4$ $kV$/cm/atm. The curves are the same for both regions 1 and 2.
Figure 7:
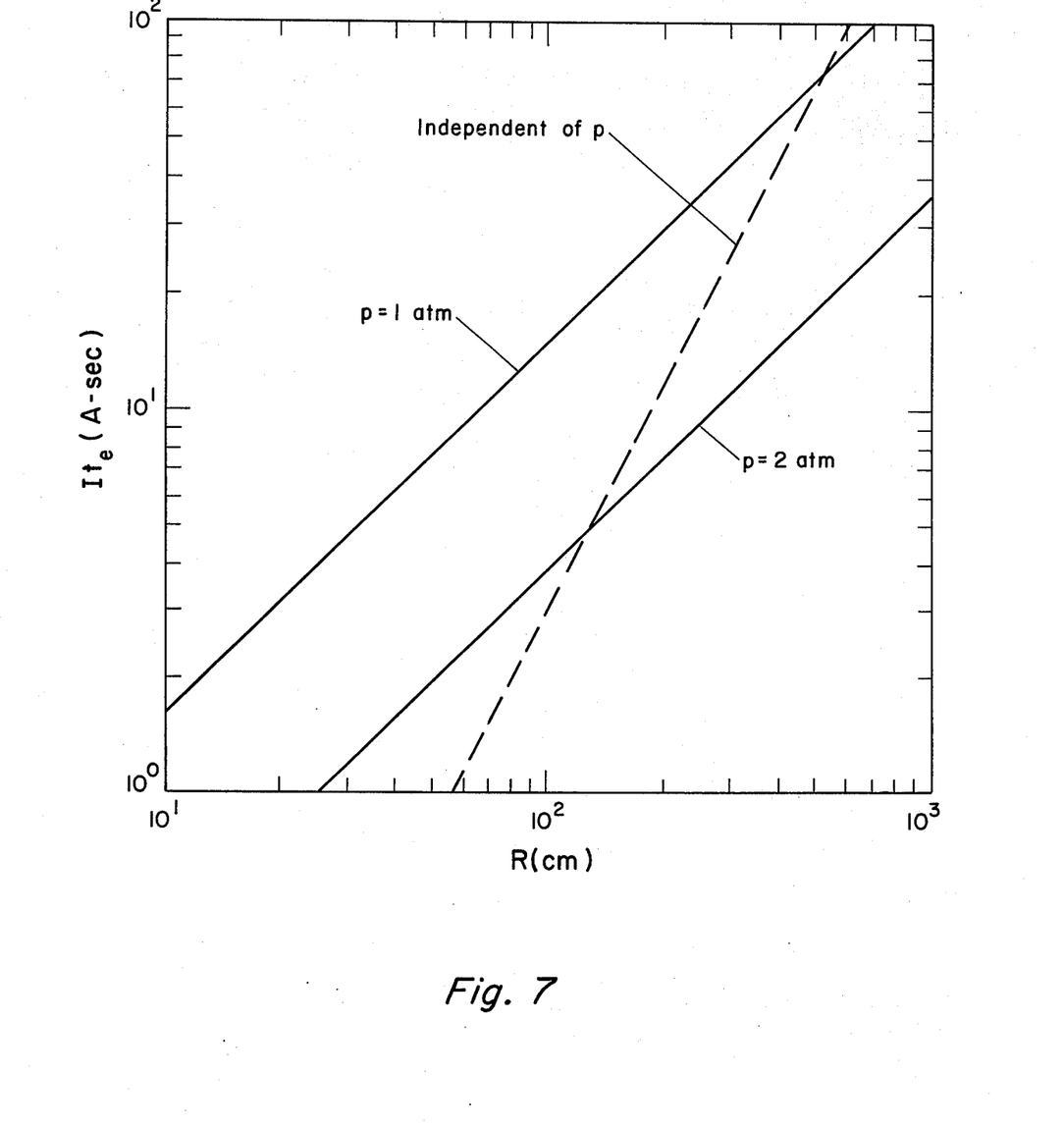
FIG. 7 gives the product of gas discharge current and pulse length as a function of radius assuming a 2 percent efficiency. There is no pressure dependence in region 1.

FIG. 3 displays the output fluence, $\phi$(joules/cm$^2$), of a typical short pulse $CO_2$ laser amplifier for selected $g_oR$ (line 1) where R is the device radius along with the breakdown threshold (line 2, Eq. (1)), both as a function of pressure. The design space one must operate in is thus bounded at low pressure by line 1 and at high pressure by line 2 with the optimum operating pressure defined by the intersection of lines 1 and 2. Using Eq. (1) and a saturation flux $\phi_s$(joules/cm$^2$) = 0.1 $p$(atm) yields for the optimum pressure $$p_{opt}(atm) = 10/\sqrt{g_oR} \qquad (4)$$

Table I lists the design equations which are applicable to operation along a saturation flux limit (line 1) and a breakdown flux limit (line 2). In Table I the symbols have the following meanings:

$\alpha$ — The fraction of input energy delivered to the upper lasing level. For the purpose of this discussion, $\alpha$ and $\beta$ are assumed to be constant.

$\beta$ — The fraction of the energy in the upper lasing level which can be extracted.

$E_{out}$ — The desired output energy (joules).

$\epsilon/p$ — The ratio of impressed electric field to gas pressure (volt/cm/atm)

$g_o$ — The small signal gain ($cm^{-1}$).

$\phi_c(p)$ — The breakdown fluence (joules/cm$^2$) as a function of pressure, $p$(atm), Eq. (1).

$\phi_s$ — The saturation flux, $\phi_s \approx 0.1\ p$ (joules/cm$^2$)

$t_e$ — The duration of the electrical discharge (sec)

$p$ — The laser pressure in atmospheres

FIGS. 4 through 7 summarize the physical characteristics of the cylindrical amplifier as given by the equations of Table I. All of the Figures indicate conditions for operation in the breakdown limit (curve 2, FIG. 3) called region 2, by solid lines and operation in the saturation region (curve 1, FIG. 3) called region 1, by dashed lines. All the information in FIGS. 4 through 7 was derived for a $5 \times 10^3$ joule amplifier operating in the allowed region between curves 1 and 2 assuming 2 percent overall efficiency, $g_o = 0.04\ cm^{-1}$, $\phi_s = 0.1\ p$ (joules/cm$^2$), and a conservative value for the breakdown flux of $\phi_c = 2/p$ (joules/cm$^2$).

From Table I and FIGS. 4 through 7 the device parameters given in Table II were obtained. The geometrical size of the system is relatively small.

TABLE II $E_{out} = 5 \times 10^3$ joules in $t_p = 2$ nsec
Assumed Overall Efficiency 2%

| Laser Cavity Parameters | |
|---|---|
| Pressure | = 2.4 atm |
| E/vol/atm | = 196 joules/liter/atm |
| Height h | = 10 cm |
| Radius R | = 130 cm |
| Voltage | = 100 kV |
| Current (It$_e$) | = 2.5 A-sec |
| E$_{in}$ (optical) | = 160 joules |

TABLE II-continued $E_{out} = 5 \times 10^3$ joules in $t_p = 2$ nsec
Assumed Overall Efficiency 2%

| Electron Gun Parameters | |
|---|---|
| Voltage | = ≥ 170 Kv |
| Current | = 0.06 A-sec |
| Duration | = ≤ 3 $\mu$sec |
| Spacing | = ≤ 18 cm anode-cathode |

Since the output fluence is kept low by increasing R, the transverse dimension h, and hence the required voltage, is kept small. This leads to a high-current, low-voltage mode of operation.

DESCRIPTION OF THE PREFERRED EMBODIMENTS

Figure 8:
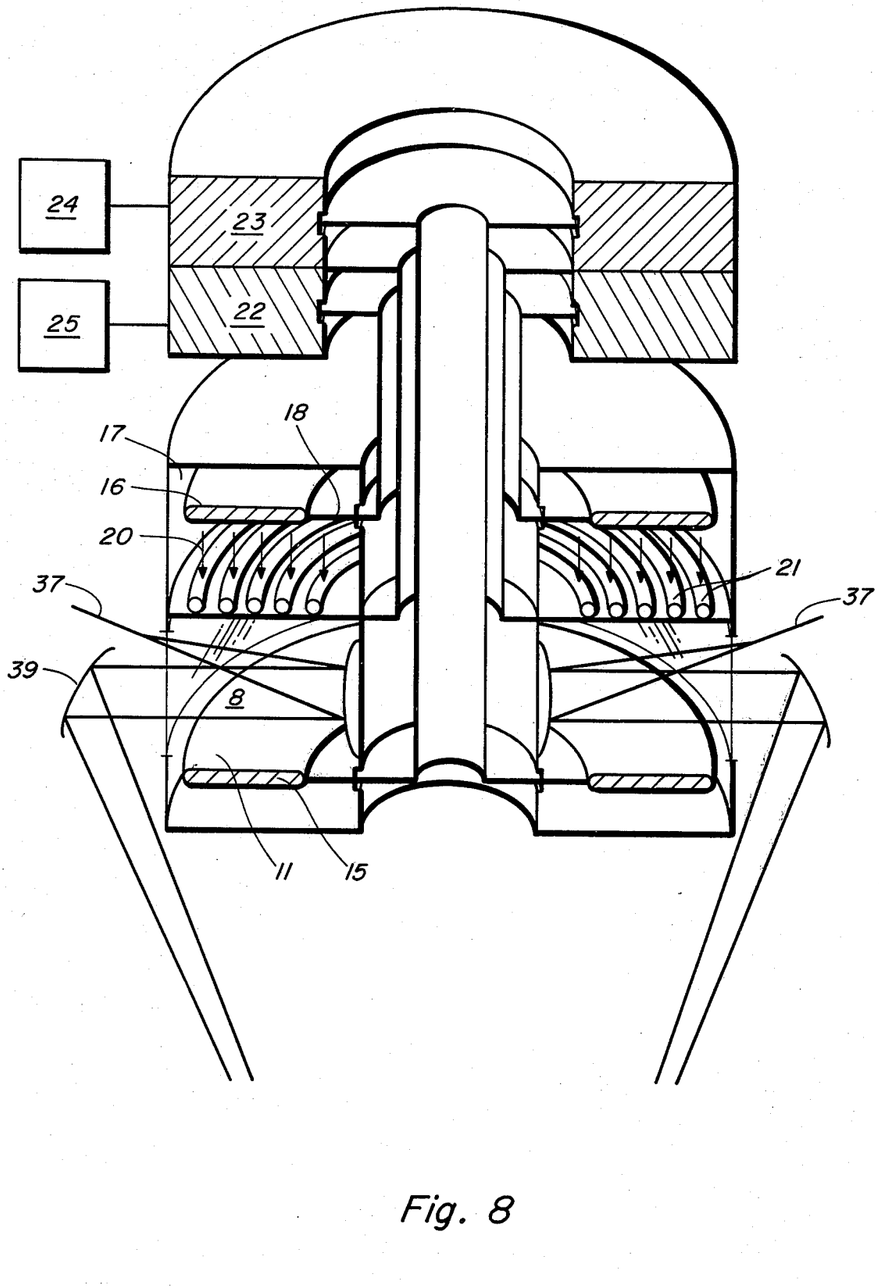
FIG. 8 is a partially cutaway perspective view of a preferred embodiment of an amplifier unit in accordance with the invention.
Figure 9:
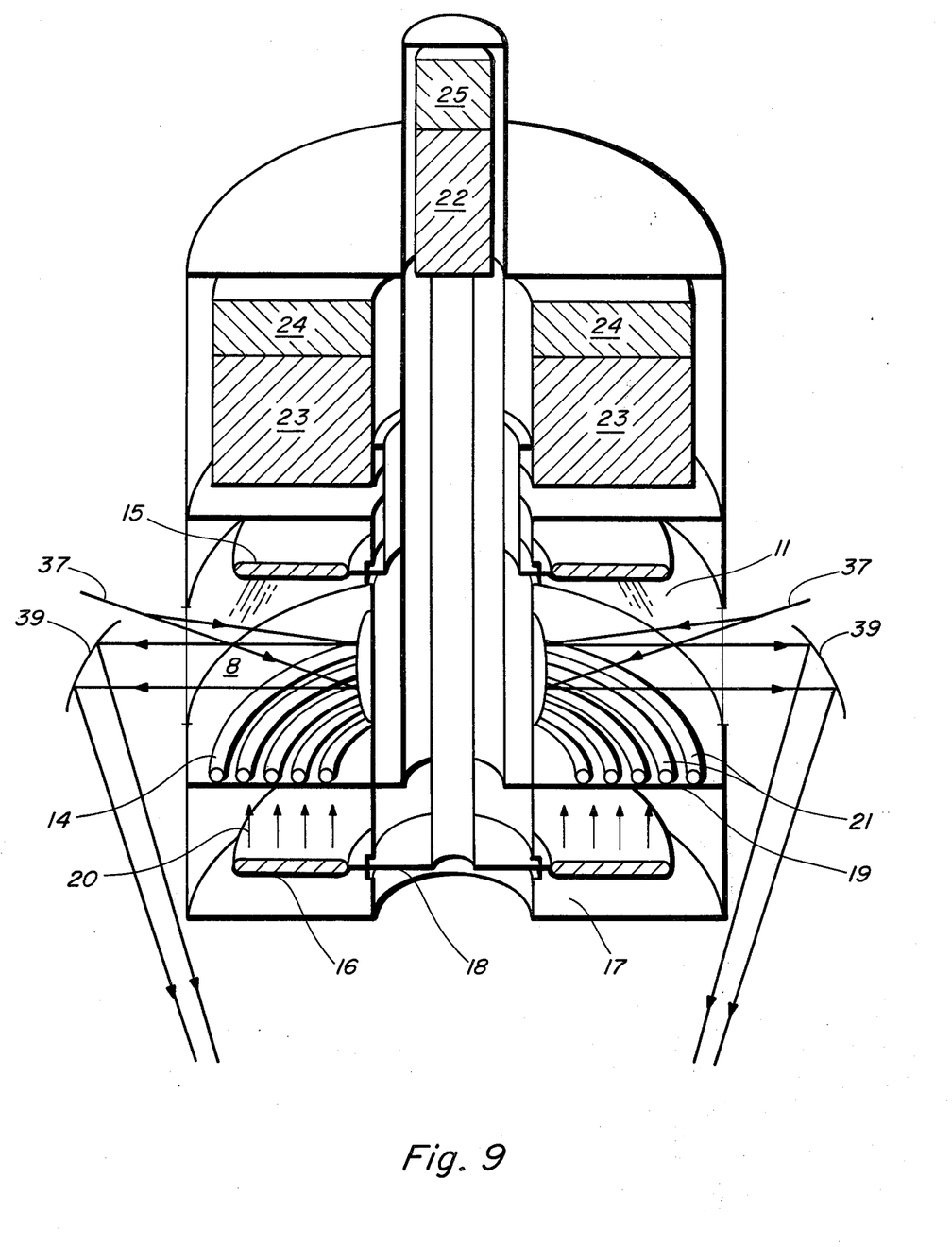
FIG. 9 is a partially cutaway perspective view of a preferred embodiment of an amplifier in accordance with the invention.

Preferred embodiments of a laser amplifier unit constructed in accordance with the present invention are shown in FIGS. 8 and 9. In these embodiments, the electrical discharge which produces the population inversion in lasing medium 11 and volumes 8 is controlled by electron beam preionization. The requisite preionization is achieved by electron beams produced by cathodes 16 in vacuum chamber 17 which have a suitable high voltage impressed on them through high voltage feeds 18. Cathodes 16 may be cold cathodes, field emission cathodes, thermionic cathodes, or any type that can supply the necessary current density. Electron energy must be sufficient to traverse discharge volume 8 at operating pressure and generate uniform ionization throughout volume 8.

An electrical field is impressed between electrode means 14 and 15, with the voltage of the field being less than the breakdown voltage of the lasing medium in volumes 8 and adjusted for pressure to yield maximum efficiency. By breakdown voltage is meant that voltage which produces narrow constricted arcing in the laser medium as the result of the action of the electrical field alone. With an appropriate vacuum in vacuum chamber 17 and an appropriate voltage applied to cathodes 16, electron beams 20 are produced which are accelerated through foil windows 19 and volumes 8 by anodes 15. The foil windows 19 and cathodes 16 and the degree of vacuum required in vacuum chamber 17 depend on whether cathodes 16 function as cold cathode

TABLE I

| Device Parameters | Region 1 $(g_oR)\phi_s < \phi_c(p)$ | Region 2 $(g_oR)\phi_s \geq \phi_c(p)$ |
|---|---|---|
| Radius (R) Height (h) | $\}\ hR^2(cm^3) = \left(\dfrac{E_{out}}{2\pi g_o \phi_s}\right) \alpha\ \dfrac{1}{p}$ | $\}\ Rh(cm^2) \geq \left[\dfrac{E_{out}}{2\pi\phi_c(1)}\right] p,$ $R \leq \left[\dfrac{2\phi_c(1)}{g_o\phi_s}\right]\dfrac{1}{p}\ \alpha\ \dfrac{1}{p^2}$ |
| Volume (Vol) | $Vol(cm^3) = \left(\dfrac{E_{out}}{g_o\phi_s}\right)\alpha\ \dfrac{1}{p}$ | $Vol(cm^3) = \pi h(R^2 - r^2) \geq \left[\dfrac{E_{out}^2}{4\pi\phi_c(1)^2}\right]\dfrac{p^2}{h}\ \alpha\ \dfrac{p^2}{h}$ |
| Discharge Energy ($E_d$) Energy Density (U) | $E_d$(joules) $= E_{out}/\alpha\beta$ $U$(joules/cm$^3$) $= \dfrac{g_o\phi_s}{\alpha\beta}\alpha\ p$ | $E_d$(joules) $= E_{out}/\alpha\beta$ $U$(joules/cm$^3$) $\leq \left[\dfrac{4\pi\phi_c(1)^2}{E_{out}}\right]\left(\dfrac{1}{\alpha\beta}\right)\dfrac{h}{p^2}\ \alpha\ \dfrac{h}{p^2}$ |
| Electrical Current (I) | $I$(amps) $= \left(\dfrac{E_{out}}{\alpha\beta}\right)\dfrac{1}{(\epsilon/p)pht_e}\ \alpha\ \dfrac{R^2}{t_e}$ | $I$(amps) $= \left[\dfrac{E_{out}}{\alpha\beta}\right]\dfrac{1}{(\epsilon/p)pht_e}\ \alpha\ \dfrac{R}{p^2 t_e}$ |
| Current Density (J) | $J$(amps/cm$^2$) $= \left(\dfrac{E_{out}}{\alpha\beta}\right)\dfrac{1}{(\epsilon/p)pht_e}\dfrac{1}{\pi(R^2-r^2)}$ | $J$(amps/cm$^2$) $= \left(\dfrac{E_{out}}{\alpha\beta}\right)\dfrac{1}{(\epsilon/p)pht_e}$ $\dfrac{1}{\pi(R^2-r^2)}\ \alpha\ \dfrac{1}{p^2 R t_e}$ |
| Impressed Voltage (V) | $V$(volts) $= (\epsilon/p)ph\ \alpha\ ph$ | $V$(volts) $= (\epsilon/p)ph\ \alpha\ ph$ | or hot cathode electron guns. The necessary vacuum is drawn by means of vacuum pumps (not shown). Windows 19 may consist of any material that will pass the high-energy electron beams 20 and yet have sufficient strength to maintain the lasing medium at high pressure (typically, atmospheric and above) on one side and a vacuum on the other. Electrode means 14 which act as cathodes for the electrical discharges through volumes 8 take the form of series of parallel rods 21 so spaced as to produce little interference with electron beams 20. Electron beams 20 have a cross-sectional area and an energy such that they produce a sufficient degree of ionization within volumes 8 that a uniform, glow-type discharge occurs throughout volumes 8 when an electrical field having a voltage less than that of the breakdown voltage of the lasing medium is impressed between electrode means 14 and 15. Each discharge imparts an electric field to the lasing medium in volumes 8 which is optimum for excitation of the upper laser level in the gas, and whose current density, and hence rate of electrical energy deposition, is determined by the electron density established by the ionization produced by electron beams 20.

Figure 10:
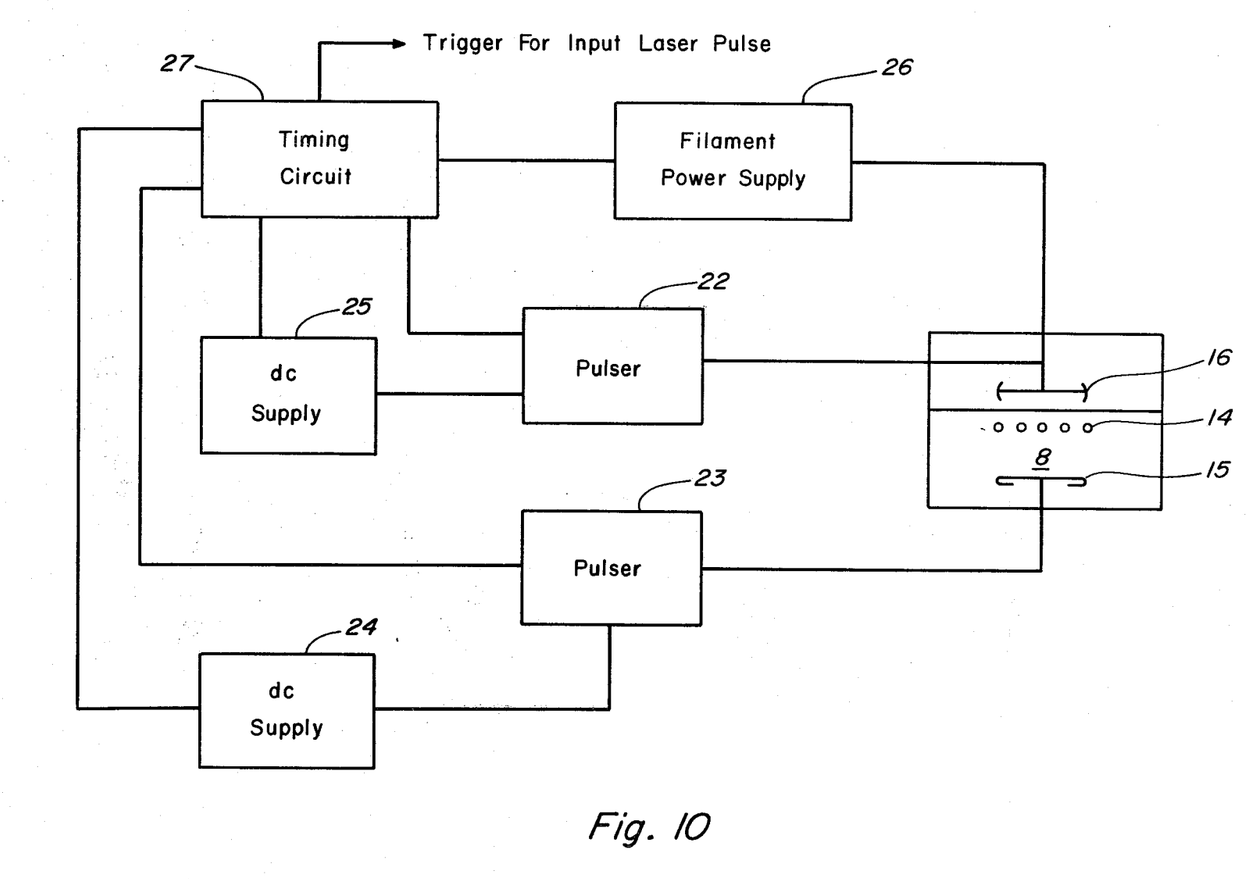
FIG. 10 is a block diagram of the circuitry associated with the electron beam ionized, gas discharge, laser amplifier of FIGS. 8 and 9.

A simplified, line type, circuit diagram is shown in FIG. 10. This diagram is for a thermionic-type electron gun 16. A cold cathode, field emission cathode, plasma cathode, or any suitable electron beam source may be substituted for the thermionic cathode. The timing circuit 27 contains a series of relays and delay circuits that are programmed to ensure the appropriate operational cycle. This operational cycle may be the following:

a. The dc supplies 24 and 25 are turned on by timing circuit 27 to charge pulsers 22 and 23. When pulsers 22 and 23 have reached a desired preset charge level, then:

b. filament power supply 26 is turned on by timing circuit 27. The filaments in the thermionic-type electron gun 16 are allowed to reach thermal equilibrium during a predetermined and preset time.

c. Timing circuit 27 then supplies a trigger pulse to electron beam pulser 22.

d. Timing circuit 27 then supplies a trigger pulse to gas pumping pulser 23 at a preset time after the electron beam pulser 22 has been fired. This voltage is applied across the lasing gas electrodes 15 and 14.

e. At a predetermined and preset time for the lasing gas to reach maximum gain condition, timing circuit 27 supplies a trigger pulse for input laser 4 (see FIG. 1).

f. Timing circuit 27 then shuts off all systems, 26, 22, 23, 24, 25 and the cycle is repeated.

If the electron beam source is a cold cathode, then the filament power supply 26 and associated control circuits are omitted.

The electron beam pulser 22 and gas pumping pulser 23 may be a Marx-surge generator, L-C generator, PFN (Pulse Forming Network) or any suitable type of high voltage pulse generator with the needed stored energy.

Figure 12:
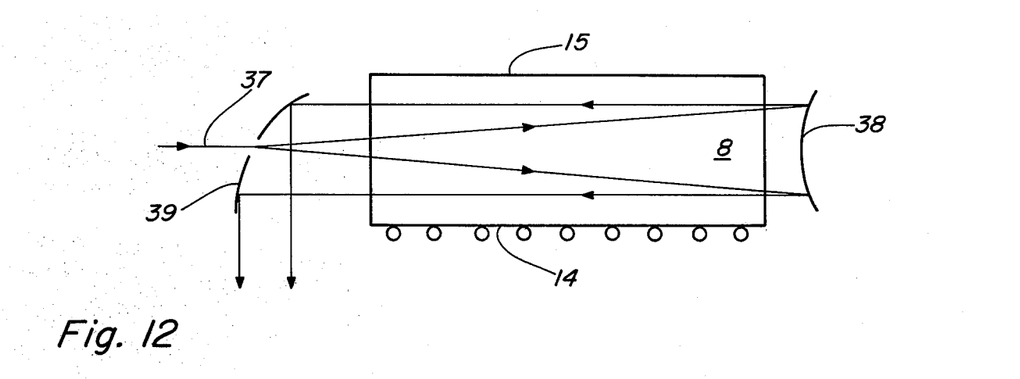
FIG. 12 is a schematic view of a two-pass optical configuration useful with the amplifier of FIGS. 8 and 9.
Figure 13:
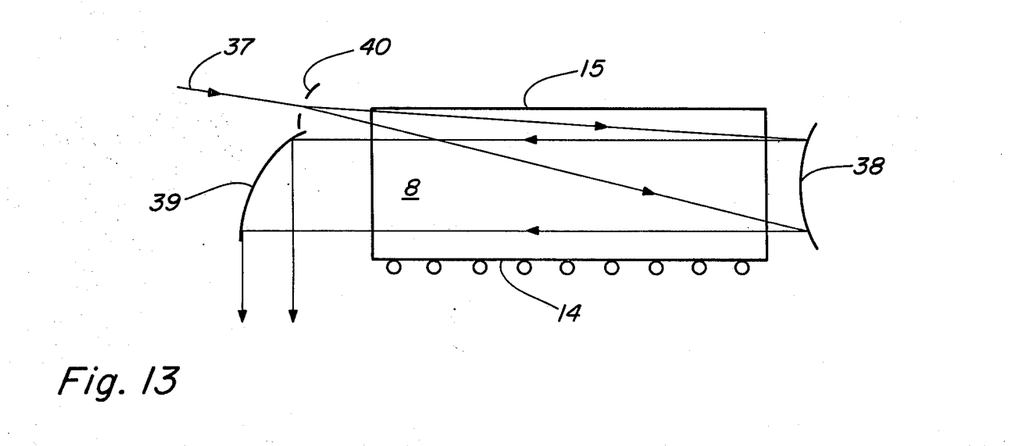
FIG. 13 is a schematic view of another two-pass optical configuration useful with the amplifier of FIGS. 8 and 9.

The invention is not limited in scope to embodiments in which the laser beam to be amplified makes but a single pass through the amplifier. Possible two-pass optical configurations are shown schematically in FIGS. 12 and 13. Thus an incoming beam 37 passes radially inward through volume 8 to mirror 38 and is reflected radially outward again through volume 8, achieving the beam expansion shown in FIG. 11. The amplified beam is then focused and directed by mirror 39. Input beam 37 may pass through a hole in mirror 39 as shown in FIG. 12 or may enter next to mirror 39 by means of optics 40 as shown in FIG. 13. It will be readily apparent that through use of appropriate optics, a three-pass configuration may be achieved with the incoming beam passing first radially outwardly through volume 8, then inwardly, and finally outwardly again. Multipass configurations of this type are desirable to reduce or eliminate the requirement for laser preamplifier stages to generate the required saturation flux $\phi_o$. When in a multipass configuration the laser chamber serves as both preamplifier and power amplifier.

We claim:

1. A high-energy gas laser amplifier system which comprises (1) means defining an annulus, (2) a plurality of radially directed baffles forming a plurality of truncated wedge-shaped working regions in said annulus-defining means, (3) a gaseous lasing medium contained in each working region, (4) means for containing said lasing medium in said working regions at a desired pressure, (5) means for producing an electrical discharge substantially uniformly throughout each of said working regions, said electrical discharge being sufficient to produce a population inversion in said lasing medium, and (6) means for expanding a laser beam to be amplified radially outwardly through said working regions.

2. The amplifier system of claim 1 including means for passing the laser beam to be amplified at least once through said working regions before being expanded radially outwardly through said working regions.

3. A high-energy gas laser amplifier system which comprises (1) a first plurality of truncated wedge-shaped planar electrodes, the planar surfaces of which form a first plane having inner and outer perimeters defined by concentric circles, (2) a second plurality of truncated wedge-shaped planar electrodes, the planar surfaces of which form a second plane having inner and outer perimeters defined by concentric circles, said first plane being in spaced parallel relationship to said second plane and defining an annular volume therebetween, each of said electrodes in said first plane being aligned to an electrode in said second plane with the volume between each such electrode pair defining a working region, (3) a plurality of radially directed baffles separating one working region from the next, (4) a gaseous lasing medium contained in each working region, (5) means for containing said lasing medium in said working regions at a desired pressure, (6) means for producing a uniform electrical discharge between said electrodes substantially throughout said working regions, said electrical discharge being sufficient to produce a population inversion in said lasing medium, and (7) means for expanding a laser beam to be amplified radially outwardly through said working region.

4. The laser of claim 3 wherein said means for producing a uniform electrical discharge between said electrodes substantially throughout said working regions comprises means for forming a plasma substantially throughout said working regions and means operatively connected to aligned electrode pairs for impressing across them a voltage less than the breakdown voltage of said lasing medium but sufficient to produce a high-energy, uniform discharge in said medium when said medium is substantially ionized.

5. The laser of claim 4 wherein said plasma forming means includes first means for generating externally of each of said working regions a broad area electron beam having a cross-sectional area conforming substantially to that of each of said working regions, said means for containing said lasing medium in said working regions including walls, one of said walls including a window impervious to said lasing medium and pervious to said electron beam, and second means for directing said electron beam into each of said working regions through said window and through said lasing medium.

* * * * *